US006770212B2

(12) United States Patent
Hayashizaki

(10) Patent No.: US 6,770,212 B2
(45) Date of Patent: Aug. 3, 2004

(54) KEY TOP AND METHOD FOR MANUFACTURE THEREOF

(75) Inventor: Koichi Hayashizaki, Suita (JP)

(73) Assignee: Atryz Yodogawa Co., Ltd., Osaka (JP)

( * ) Notice: Subject to any disclaimer, the term of this patent is extended or adjusted under 35 U.S.C. 154(b) by 54 days.

(21) Appl. No.: 09/986,074

(22) Filed: Nov. 7, 2001

(65) Prior Publication Data

US 2002/0063109 A1 May 30, 2002

(30) Foreign Application Priority Data

Nov. 8, 2000 (JP) ....................................... 2000-339854

(51) Int. Cl.[7] ........................... C03C 25/68; B44C 1/22; H01H 3/12

(52) U.S. Cl. ............................ 216/28; 216/54; 29/622; 379/433.7; 428/137; 428/195; 400/472; 200/341

(58) Field of Search ....................... 216/28, 54; 29/622; 379/433.7, 433.07; 428/137, 195; 400/472; 200/341

(56) References Cited

U.S. PATENT DOCUMENTS 4,529,849 A * 7/1985 Kamei et al. ............... 200/5 A
5,387,495 A * 2/1995 Lee et al. ................... 430/315
6,383,604 B1 * 5/2002 Yoo et al. ................... 428/137

FOREIGN PATENT DOCUMENTS

JP 2-50878 A * 2/1990 ............ B41M/3/00
JP 04-037487 2/1992
JP 04-163185 6/1992
JP 7-164728 A * 6/1995 ............ B41M/3/12
JP 2-113762 A * 4/2000 .......... H01H/13/02
JP 2000-243174 9/2000

* cited by examiner

*Primary Examiner*—Nadine G. Norton
*Assistant Examiner*—Shamim Ahmed
(74) *Attorney, Agent, or Firm*—Wenderoth, Lind & Ponack L.L.P.

(57) ABSTRACT

The object of the present invention is to provide a method of manufacturing a metallic switch with high productivity. A transparent printed layer (4) is patterned and formed on a metalizing layer (3) formed on the front surface of a transfer substrate, and the metalizing layer (3) is subjected to etching. The metalizing layer (3) and the transparent printed layer (4) are integrally transferred onto a key top body (6). As a result, the metalizing layer, which has a low strength and can be easily fractured, is protected and reinforced by the transparent printed layer (4), the metalizing layer can be transferred with high stability, and a metallic switch is manufactured in an easy manner and with good efficiency.

12 Claims, 2 Drawing Sheets

KEY TOP AND METHOD FOR MANUFACTURE THEREOF

BACKGROUND OF THE INVENTION

1. Field of the Invention

The present invention relates to a method for the manufacture of a key top for a push button switch preferably used in input devices such as cellular phones and keyboards.

2. Description of Related Art

Switches having a structure consisting of a rubber contact switch and a key top installed on the top portion of the key switch have been generally used as push button switches employed in cellular phones and the like.

Push button switches are also required to have excellent appearance, and the demand for metallic-like switches of this type has recently increased. Technology relating to methods for the manufacture of metallic-like push button switches (referred to as "metallic switches" hereinbelow) of an illumination type, which are used in portable phones, was disclosed in Examined Japanese Patent Application No. 3-23915 and Unexamined Japanese Patent Application 2000-176659. In accordance with this technology, a metal layer is formed on a key top and then part of the metal is evaporated and dissipated with a laser to obtain letters, symbols and the like. Furthermore, when colored, e.g., red or blue, metallic switches rather than switches with metallic colors are manufactured, a transparent colored layer is formed on the key top surface, then a metal layer is formed, and only a metal layer is evaporated with a laser.

However, with the above-described method, because laser processing is employed, mass production is difficult to Implement. Furthermore, since the entire procedure, from the first to the last stage, is conducted on the key top, if a defect occurs in the last stage, all the preceding operations become useless and the productivity is poor.

Furthermore, when a colored metallic button is manufactured, though the metal layer is removed with a laser, the transparent colored layer is not removed and remains as is. Thus, in order to remove the metal layer, a short-wavelength laser radiation such as that of YAG (yttrium aluminum garnet) laser has to be used, such short-wavelength laser radiation penetrating through plastics. Therefore, the problem associated with such a method is that the transparent colored layer remains without changes and the color of the light that penetrates through the metallic button is restricted to the color of the colored layer.

SUMMARY OF THE INVENTION

With the foregoing in view, it is an object of the present invention to provide a method for the manufacture of a metallic switch which allows high productivity. It is also an object of the invention to provide a colored metallic switch with a high added value, in which no limitation is placed on the color of the transmitted light.

The method for the manufacture of a metallic switch in accordance with the present invention, which attains the above-described objects, comprises the steps of forming a metalizing layer on the surface of a transfer substrate, forming a first transparent printed layer patterned as letters, numbers, symbols, pictures, and the like and having resistance to etching on the metalizing layer, removing the metalizing layer which is not masked by the transparent printed layer by etching, placing the transfer substrate on the plastic key top body, and transferring the transfer layer consisting of the metalizing layer and masking material layer after etching onto the key top body.

Thus, transferring of the masking material (first transparent printed layer) which, within the framework of the conventional technology, was considered merely as a protective layer for etching and was removed after etching onto the key top body integrally with the metalizing layer, makes it unnecessary to remove the masking material. Moreover, the metalizing layer which has a low strength and can be easily fractured is protected and reinforced by the transparent printed layer. Therefore, transferring of the metalizing layer can be conducted with high stability, and a metallic switch can be manufactured in an easy and efficient manner.

The transfer layer may be transferred either on the front or rear surface of the key top body, and the transfer operation is conducted so that the first transparent printed layer is brought in contact with the key top body. When the transfer layer is transferred onto the front surface of the key top, the metalizing layer is at the front surface side of the key top and a metallic switch with a color of the metalizing layer is obtained. When the transfer layer is transferred onto the rear surface of the key top, the transparent printed layer is at the front surface side of the key top and, if a colored transparent printed layer is used, the metalizing layer is colored and a colored metallic switch is obtained.

In order to transfer the transfer layer, a hot press method can be used. If the first transparent printed layer demonstrates stickiness during heating, the direct transfer to the key top body is possible. However, if a transparent adhesive layer is formed on the transparent printed layer, the transfer layer can be transferred onto the key top body with higher reliability and without the danger of misalignment.

No specific restriction is placed on the transfer substrate, provided that it is highly flexible and resistant to beat and etching. Examples of suitable materials include films or sheets of plastics with high heat resistance and mechanical strength such as PET (polyethylene terephthalate). If such flexible transfer substrate is used, even when the transfer layer is formed on the key top body having peaks and valleys, the transfer substrate follows the curved surface and can be reliably laminated onto the key top body. Therefore, the number of printing defects occurring in the metalizing layer and first transparent printed layer can be decreased by comparison with the case when the printed layer is formed directly on the key top body.

In accordance with the present invention, the metalizing layer and transparent printed layer are formed separately from the key top body, and those layers are transferred onto the key top only in the final stage. Therefore, the defect ratio in the key tops as a final product can be reduced. Furthermore, the metalizing layer and transparent printed layer are formed on a film- or sheet-like substrate rather than on the key top body having high rigidity. Therefore, the substrate can be supplied as a roll. If the substrate is coiled up into rolls and stored after the metalizing layer and transparent printed layer have been formed, the transfer substrate serves as a protective layer for both layers. Therefore, the substrate can be handled easily and space for manufacturing equipment can be saved.

The first transparent printed layer is patterned as letters, numbers, symbols, pictures, and the like, and the metalizing layer in the portion thereof which is not covered with the printed layer is removed by etching. Therefore, when the transparent printed layer is colored and the transfer layer is transferred onto the rear surface of the key top body, only portions where the metalizing layer is present are colored, and portions from which the metaling layer has been removed are in a state in which the transparent printed layer has also been removed. Therefore, a metalizing switch with a high added value can be provided without placing a limitation on the color of the light that passes through the switch, while coloring the metalizing layer portions.

Furthermore, if a second transparent printed layer is formed on the surface of a transfer substrate prior to the step of forming the metalizing layer and then the transfer layer containing the second transparent printed layer is transferred onto the back surface of the key top body, a key top is obtained in which the metalizing layer is covered and protected by the second transparent printed layer. Thus, the damage, peeling, or modification of the metalizing layer can be prevented.

If a colored layer is used as the second transparent printed layer in the above-described process, the light that passes through the metallic switch can be colored appropriately. The second transparent printed layer may have a single color or it may be multicolored. When coloration is the object, printing may be conducted on a portion of the transfer layer.

More specifically, in a push button switch of a control unit of a cellular phone, a colored first transparent printed layer is used, a green printed material is employed for a button with a picture of a receiver indicating the communication state, a red printing material is employed for a button with a picture of receiver indicating the end of communication, and colorless transparent printing materials are used for other buttons as the second transparent printer layer. Therefore, a colored metallic switch can be obtained which has three different colors: green and red colors of transmitted light and the color of light-emitting elements. Thus, the added value can be increased and a metallic switch with excellent endurance can be obtained because the metalizing layer is covered and protected with the second transparent printer layer.

Furthermore, if the transfer substrate is a material having poor adhesion to the metalizing layer, for example, from a PET film, the metalizing layer can be directly formed on the substrate surface. However, if a parting agent is coated in advance on the surface of the transfer substrate, transfer defects can be prevented.

No specific limitation is placed on the material of the key top body. Thus, hard plastics, soft plastics, or rubber material can be used, provided that they are transparent.

The term metalizing layer means a metal film formed by vapor deposition, sputtering, ion plating, electrolytic plating and the like. Among those methods, a vapor deposition method is typically used. No limitation is placed on the type of the metal, but aluminum is preferably used. The metalizing layer formed from aluminum has a silver color, but this color can be changed into a variety of colors by forming a colored transparent printed layer.

No specific limitation is placed on the thickness of the metalizing layer. However, the preferred thickness facilitating etching and also allowing the metalizing layer to serve as a shield for light from a light source installed inside the casing is 350–500 Å.

The printed materials used for the first and second transparent printed layer can be used without any specific limitation, provided that they are resistant to the below-described etching solution and protect the metalizing layer coated on the transparent printed layer from the etching solution. Etching resists can be advantageously used for this purpose. When the transfer layer is transferred onto the back surface of the key top body, if the first transparent printed layer is colorless and contains no coloring material, a colorless metallic switch with an as-is metalizing layer is obtained. When coloring materials such as pigments, dyes, and the like are used, a colored metallic switch is obtained. Furthermore, the transfer material such as an etching resist may be in the form of an ink and a pattern printing can be conducted, for example, by a screen printing process. When the transfer material is in the form of a photocurable film, it is possible to conduct exposure followed by development.

Furthermore, the symbol pattern such as letters, numerals, pictures, and the like formed by the first transparent printed layer may also be obtained by printing a patterned portion and then removing the surrounding metalizing layer. However, it is preferred that an empty symbol be obtained by printing the portions outside of the pattern and removing the metalizing layer of the pattern portions. In such a case, the light passing through the switch brings the symbol to the front, thereby providing for an excellent appearance. Furthermore, since the etching zone can be decreased, the service life of the etching solution can be extended.

The etching solution may be appropriately selected according to the type of the metalizing layer. For example, when the metalizing layer is made of aluminum, an alkaline aqueous solution such as 5% aqueous solution of sodium hydroxide or an acidic aqueous solution such as hydrochloric acid are preferably used.

As described above, in the key top in which an empty-symbol printed layer consisting of two layers, namely, a first transparent printed layer and a metalizing layer, is formed on the back surface of a key top body, the front surface is covered with the key top body and therefore protected from damage. Furthermore, if a colored printed material is used, a colored metallic switch can be obtained which is free from limitations imposed by the color of transmitted light.

Furthermore, if the second transparent printed layer is formed on the back surface of the empty-symbol printed layer and colored printed materials of different colors are used for the first and second transparent printed layers, then the transmitted light can be various colors, and a colored metallic switch can be obtained which is a colorful type unknown in the prior art and which provides a high added value.

DETAILED DESCRIPTION OF THE INVENTION

Figures 1A, 1B, 1C, 1D, 1E, 1F, 1G:
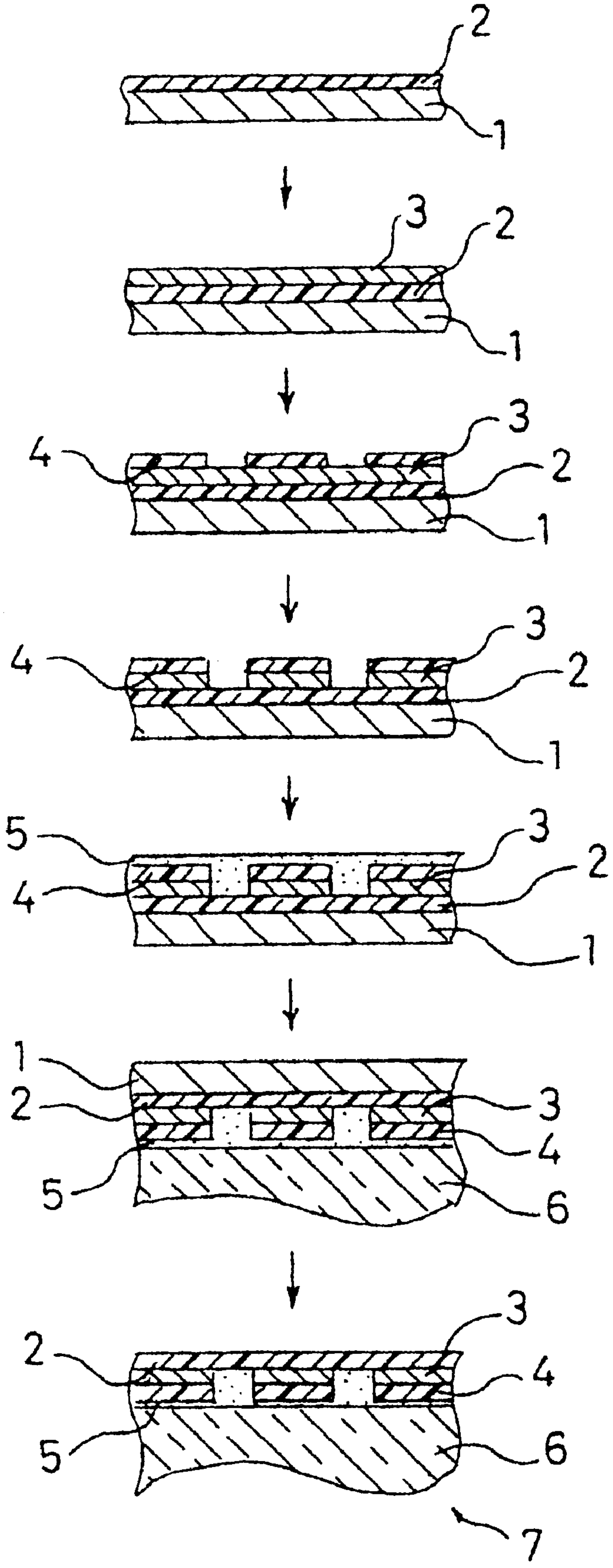
FIGS. 1(A) through 1(G) are diagrams illustrating the steps of a key top production method of an embodiment of the present invention.
Figure 2:
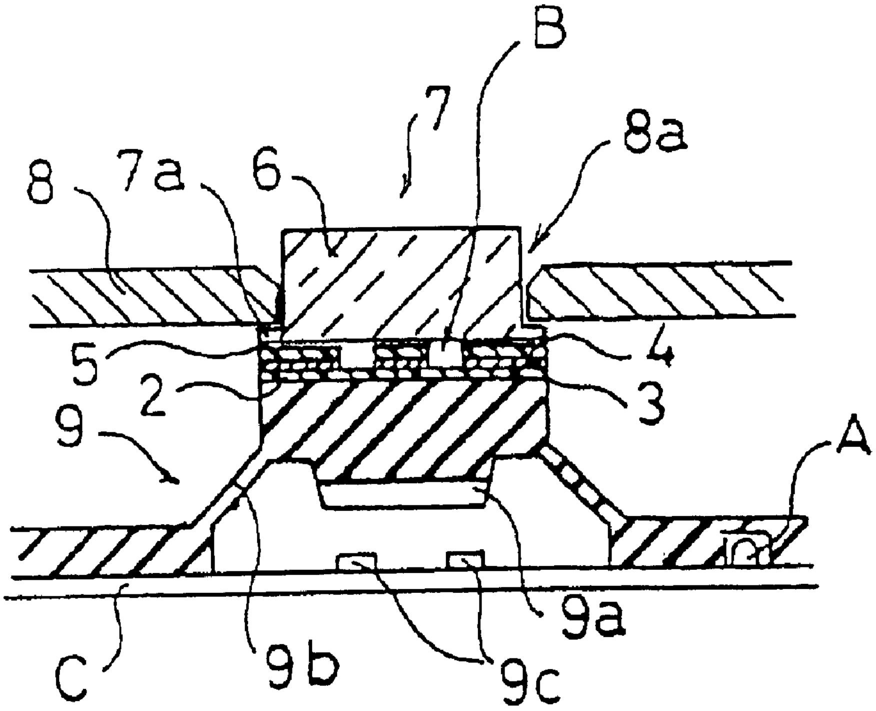
FIG. 2 is a schematic diagram illustrating the utilization of a key top.

Reference numeral 1 denotes a transfer substrate, reference numeral 2 denotes a second transparent printed layer, reference numeral 3 denotes a metalizing layer, reference numeral 4 denotes a first transparent printed layer, reference numeral 5 denotes an adhesive layer, reference numeral 6 denotes a key top body, and reference numeral 7 denotes a key top. FIG. 1 and FIG. 2 illustrate a preferred embodiment of the present invention. FIG. 1 illustrates the key top manufacturing process. FIG. 2 is a schematic diagram illustrating the utilization mode of the manufactured key top.

Various stages of the manufacturing process shown in FIG. 1 will be described below. In the present preferred embodiment, a PET film is used as a transfer substrate 1, and a silicone-based parting agent is coated on the front surface of the transfer substrate 1. Then, as shown in FIG. 1(*a*), a colored second transparent printed layer 2 is formed on the front surface of the transfer substrate 1 and, as shown in FIG. 1(*b*), aluminum is deposited on the front surface of the second transparent printed layer by a vapor deposition method so as to form a metalizing layer 3.

Then, as shown in FIG. 1(*c*), an empty-symbol pattern is formed with a first transparent printed layer 4 colored in a color different from that of the second transparent printed layer 2. As shown in FIG. 1(*d*), the metalizing layer 3 which is not covered with the first transparent printed layer 4 is etched by an alkaline solution. As a result, an empty-symbol printed layer consisting of the first transparent printed layer 4 and metalizing layer 3 is formed.

Then, as shown in FIG. 1(*e*), an adhesive is coated on the front surface of the first transparent printed layer 4 so that an adhesive layer 5 is formed. As a result, a transfer material is produced in which a transfer layer is formed on the transfer substrate, this transfer layer consisting of the following four layers: adhesive layer 5, first transparent printed layer 4, metalizing layer 3, and second transparent printed layer 2. The transfer material thus produced is stored upon winding into a roll, and may be appropriately supplied to a subsequent processing step.

The transfer material thus produced is placed on the back surface of the key top body 6 consisting of transparent plastic such as polycarbonate resins or acrylic resins so that the adhesive layer 5 is brought in contact with the key top body, as shown in FIG. 1(*f*), and the transfer layer is transferred by a thermal pressing method. In this process, various thermal pressing methods can be appropriately used. Examples of such methods include an up-down method, a thermal roil method, a press-roll method by which the overlapping transfer material is pressed against the side of the key top body, and an in-mold method by which transfer is conducted simultaneously with the formation or the key-top body. Upon completion of the transfer, as shown in FIG. 1(*g*), the transfer substrate 1 is removed which makes it possible to obtain a key top 7 with a transfer layer laminated thereon.

An example of the utilization mode of the key top 7 obtained in the above-described manner is shown in FIG. 2. This figure shows a push button switch used as an operation unit of a cellular phone. The operation unit consists of several switches. To simplify the explanation, only one switch is considered and a cross section thereof is schematically shown in the figure.

As shown in the figure, the push button switch is composed of a rubber contact switch 9 and the key top 7 above the switch 9. A top portion of the key top 7 protrudes from an opening 8*a* provided in a casing 8. A flange 7*a* having a diameter somewhat larger that that of the opening 8*a* is formed at the lower end periphery of key top 7. This flange prevents key top 7 from being pushed through the opening 8*a,* and also prevents leakage of the light emitted by a light source A disposed inside the casing 8 through a gap between the opening 8*a* and key top 7. Therefore, the key top 7 may be placed above the rubber contact switch 9, but if it is secured with a transparent adhesive, a push button switch with a stable operation feeling can be obtained.

The rubber contact switch 9 is made of a transparent rubber and it comprises a thin elastic portion 9*b* having a skirt-like shape and a contact element 9*a* provided on the back surface of the top portion thereof. When the push button switch is pushed, the movable contact element 9*a* is brought in contact with a fixed contact element 9*c* provided on a printed substrate C and the switch is turned ON.

The key top 7 has a configuration in which the above-described transfer layer having a four-layer structure is transferred onto the back surface of key top body 6. The transfer layer is obtained by successively laminating (from the key top body 6 side) the adhesive layer 5, first transparent printed layer 4, metalizing layer 3, and second transparent printed layer 2. Therefore, light emitted from the light source A passes through the transparent rubber contact switch 9 and second transparent printed layer 2, but most of the light is reflected by the metalizing layer 3, and a part of the light is emitted to the outside through an empty symbol portion B formed by etching of the metalizing layer 3.

At this time, the transmitted light from the empty symbol portion B passes through and is colored by the second transparent printed layer 2, and the portion of the transfer layer surrounding the empty symbol portion B is recognized as a non-transparent colored metallic portion colored by the first transparent printed layer.

The present invention is not limited to the above-described embodiment, and it goes without saying that various amendments and modifications can be made without departing from the scope of the present invention. For example, the transparent printed layer used in the preferred embodiment may be only colored and also have a variable degree of transparency. More specifically, if the second transparent printed layer is provided with a milk-white coloration reducing its transparency, the transmitted light becomes soft and a switch with excellent appearance can be obtained.

As described above, in accordance with the present invention, the first transparent printed layer functioning as a masking material in the etching process is transferred onto the key top body as a transfer layer in which it is integrated with a metalizing layer. As a result, the process of removing the masking material becomes unnecessary, the metalizing layer, which has a lower strength and can be easily fractured, is protected and reinforced by the first transparent printed layer, the metalizing layer can be transferred with high stability, and a metallic switch can be produced with high stability and in an easy manner.

Furthermore, when the transfer layer is transferred onto the back surface of the key top, the first transparent printed layer becomes a front surface layer. If a colored transfer material is used, a portion where the metalizing layer is present is colored, but a portion from which the metalizing layer has been removed is not colored, and a colored metallic switch with a high added value can be obtained.

Furthermore, if a second transparent printed layer is formed on the front surface of the substrate prior to the formation of the metalizing layer, and a layer additionally containing the second transparent printed layer is transferred as a transfer layer, a key top is obtained in which the metalizing layer is covered and protected by the second transparent printed layer. As a result, fracture, peeling, and modification of the metalizing layer can be prevented.

Moreover, if a colored layer is used as the second transparent printed layer, the light passing through the metallic switch can be colored appropriately and a metallic switch with a high added value can be obtained.

What is claimed is:

1. A method of manufacturing a key top, said method comprising:

forming a metalizing layer on a transfer substrate;

forming a first transparent printed layer in a pattern on the metalizing layer, the first transparent printed layer being resistant to etching;

etching the metalizing layer so as to remove a portion of the metalizing layer not masked by the first transparent printed layer, whereby a transfer layer including the etched metalizing layer and the first transparent printed layer is formed; and after said etching of the metalizing layer to form the transfer layer, placing the transfer substrate on a plastic key top body so as to transfer the transfer layer onto the key top body.

2. The method of claim 1, further comprising forming a second transparent printed layer on a front surface of the transfer substrate prior to said forming of the metalizing layer, wherein the metalizing layer is formed on a front surface of the second transparent printed layer, and whereby the transfer layer includes the second transparent printed layer, the metalizing layer, and the first transparent printed layer.

3. The method of claim 2, further comprising forming a parting agent layer on the front surface of the transfer substrate prior to said forming of the second transparent printed layer, wherein the second transparent printed layer is formed on the parting agent layer.

4. The method of claim 2, wherein the second transparent printed layer is resistant to etching.

5. The method of claim 2, further comprising, after said etching of the metalizing layer and prior to said placing of the transfer substrate on the plastic key body, forming a transparent adhesive layer on the exposed surfaces of the second transparent printed layer, the metalizing layer, and the first transparent printed layer, whereby the transfer layer includes the second transparent printed layer, the metalizing layer, the first transparent printed layer, and the transparent adhesive layer.

6. The method of claim 2, wherein said etching comprises etching using an etching solution, the etching solution comprising one of an alkaline aqueous solution and an acidic aqueous solution.

7. The method of claim 2, further comprising, after said placing of the transfer substrate on the plastic key top body, removing the transfer substrate such that the transfer layer remains on the plastic key top body.

8. The method of claim 1, further comprising forming a parting agent layer on the front surface of the transfer substrate prior to said forming of the metalizing layer, wherein the metalizing layer is formed on the parting agent layer.

9. The method of claim 1, further comprising, after said etching of the metalizing layer and prior to said placing of the transfer substrate on the plastic key body, forming a transparent adhesive layer on the exposed surfaces of the metalizing layer and the first transparent printed layer, whereby the transfer layer includes the metalizing layer, the first transparent printed layer, and the transparent adhesive layer.

10. The method of claim 1, wherein said etching comprises etching using an etching solution, the etching solution comprising one of an alkaline aqueous solution and an acidic aqueous solution.

11. The method of claim 1, further comprising, after said placing of the transfer substrate on the plastic key top body, removing the transfer substrate such that the transfer layer remains on the plastic key top body.

12. The method of claim 1, wherein said forming of the first transparent printed layer in a pattern on the metalizing layer letters comprises forming the first transparent printed layer so as to have one of a letter pattern, a number pattern, a symbol pattern, and a picture pattern.

* * * * *